Jan. 28, 1969    J. W. SEVERINGHAUS    3,424,664
pH ELECTRODE
Filed Jan. 6, 1966
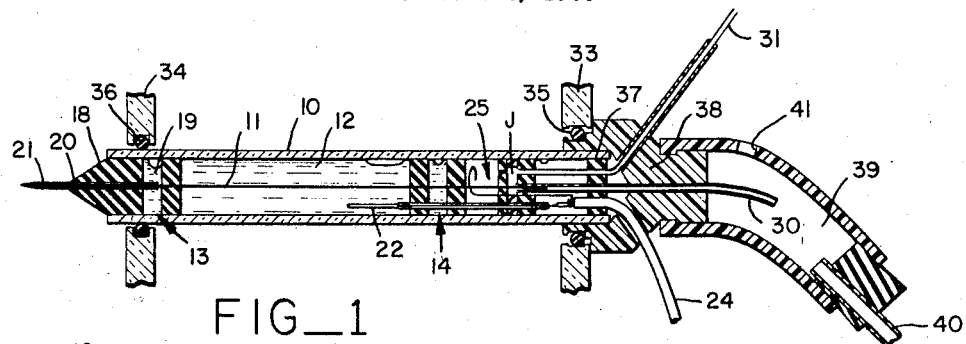
FIG_1
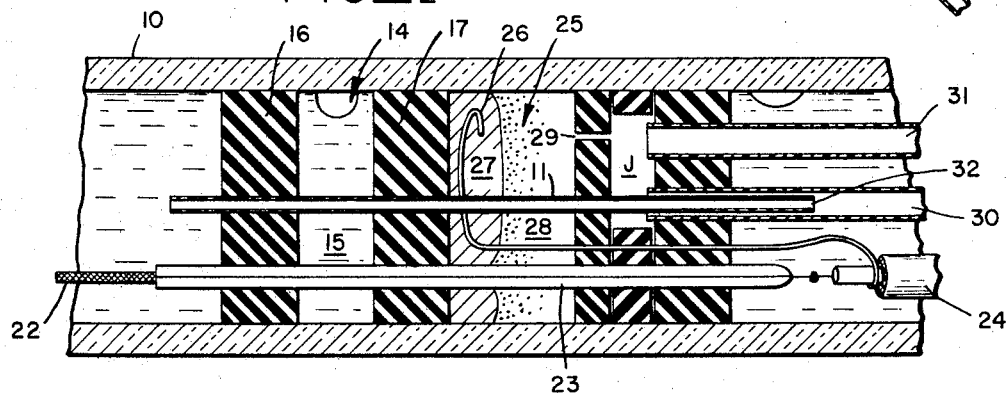
FIG_2
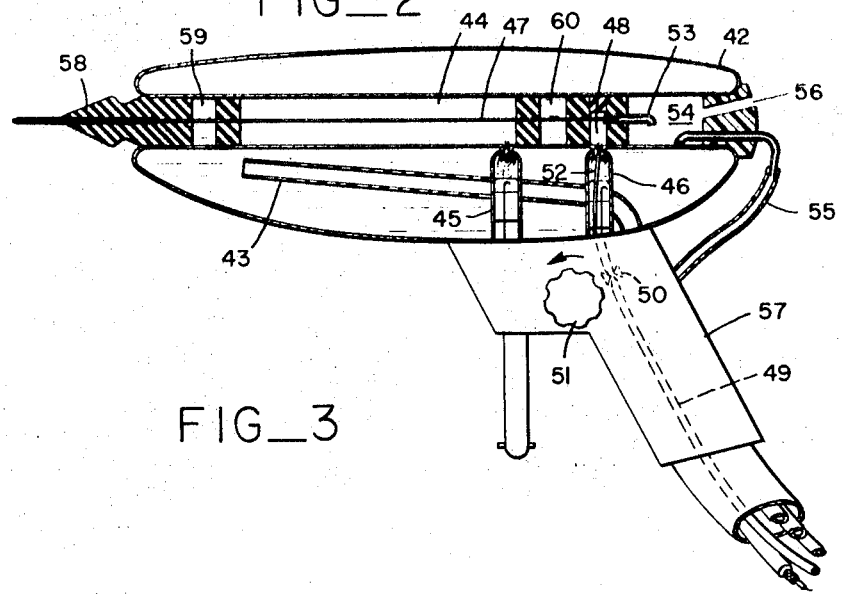
FIG_3
INVENTOR
JOHN W. SEVERINGHAUS
BY
Townsend and Townsend
ATTORNEYS

United States Patent Office

3,424,664
Patented Jan. 28, 1969

3,424,664
pH ELECTRODE
John W. Severinghaus, Ross, Calif., assignor to The
Regents of the University of California
Filed Jan. 6, 1966, Ser. No. 519,048
U.S. Cl. 204—195          11 Claims
Int. Cl. B01k 3/00

ABSTRACT OF THE DISCLOSURE

A capillary pH electrode having an enclosed liquid junction permitting horizontal orientation of the capillary glass membrane relative to the liquid junction with a vertical interface. The liquid junction is open and unrestricted with respect to fluid communication with the reference electrode and further includes inlet and outlet conduits for easy flushing and replacement of electrolyte solution in the liquid junction.

---

This invention relates to cells for determining pH. More particularly, the invention relates to a number of improvements in the construction of such cells, especially with respect to the liquid junction between the pH electrode and the reference electrode.

The liquid junction in a pH-reference electrode pair is a source of error, especially when used for measuring the pH in blood or other biological solutions. Some prior designs for the liquid junction have exhibited errors in measurement induced by back diffusion of liquids of varying ionic strength and composition into the junction, especially when the system has been washed with water. Where the reference electrode has been pressurized to prevent back diffusion, errors have been introduced by streaming potentials.

More recent efforts to avoid such problems include substituting an open junction for the fixed junction. The open junction is usually made by dipping a capillary tip containing the sample into a saturated electrolyte such as potassium chloride solution connected to the reference electrode. Such a junction is said to be gravity stabilized, since the heavier potassium chloride is below the sample. In such a case, where blood is being analyzed, a precipitation of protein by potassium chloride at the interface is believed to stabilize the liquid junction.

A number of disadvantages remain even with these latter efforts for avoiding errors associated with the liquid junction. A physical manipulation of the liquid junction is still necessary; for example, in most systems the pH electrode itself is positioned to cause the tip of the sample capillary to dip into a cup of saturated potassium chloride. In many cases, with blood for example, some sample may leak out into the potassium chloride and result in errors as the red cells settle on a porous fibre at the cup bottom. The cup must then be emptied and cleaned periodically. Finally, in prior pH electrodes, a separate water jacket had to be arranged to keep the reference electrode and liquid junction at the temperature of the pH electrode. Without attention to temperature control, an error of about 0.01 pH unit can be introduced. Even with water jackets, part of the liquid junction pathway is ordinarily not temperature controlled.

The accompanying drawing illustrates two embodiments of an improved pH electrode of the capillary type integrated in a cell for measuring pH, which avoids all of the above problems and provides additional advantageous features.

FIG. 1 is a side sectional view of a composite pH-reference electrode.

FIG. 2 is an enlarged side section of the embodiment of FIG. 1 in the vicinity of the liquid junction between the pH and reference electrodes.

FIG. 3 is a side view partially in section of an alternate embodiment of the present invention in which the pH and reference electrodes are positioned in a water jacket.

In the principal aspect of the invention, the improved cell for determining pH includes a new type of liquid junction. In essence, the liquid junction includes a liquid junction chamber having a discharge conduit in fluid communication with it. An inlet conduit for input of fresh electrolyte solution into the liquid junction chamber is connected to the junction chamber. A pH electrode, including a sample holding tube, is positioned so that the sample holding tube has one end in fluid communication with the junction chamber. The cell further includes a suitable reference electrode, together with a conduit other than the above discharge conduit which is connected to establish fluid communication between the reference electrode and the liquid junction chamber. With such an arrangement, the liquid junction can be freshly formed after each filling of the sample holding tube simply by flushing an appropriate amount of electrolyte, such as potassium chloride, from a reservoir through the inlet conduit, then through the junction chamber, and out through the discharge conduit.

In the preferred embodiment, the cell is of the capillary type and the sample holding tube is an elongate glass capillary membrane housed within an elongate pH electrode chamber. The reference electrode is positioned internally of the elongate pH electrode chamber and the sample holding capillary tube passes through the reference electrode. Surprisingly, it has been found that no error is induced with such an arrangement. At the same time this novel configuration permits mounting in conventional fashion in a water bath with the ends of the elongate chamber projecting outwardly therefrom. As a result, the electrode can be used in conjunction with other types of electrodes such as oxygen and carbon dioxide electrodes with the advantage that all of the electrodes are kept at constant temperature all of the time without need of a circulating pump.

Alternatively, the new cell construction, including the above type of liquid junction which will be described in more detail, can be easily encased in a water jacket. In either configuration, it is advantageous to have the end of the sample holding capillary tube which communicates with the liquid junction inserted interiorly within the discharge conduit in a loose fitting relationship so that fluid can pass around the exterior of the sample holding tube. With this relationship, the liquid junction is formed at the tip of the sample holding capillary tube and with the unit positioned generally horizontally, the interface between the sample and the fluid of the junction chamber is vertical, rather than horizontal.

This vertical interface has a theoretical advantage for biological use with fluids such as blood. The electrolyte employed such as potassium chloride crenates red cells making them even heavier than the potassium chloride. In the usual horizontal interface the cells tend to fall from the capillary tip if a protein film does not protect them. Potassium chloride then enters the tip to replace their volume and reacts with more cells. In the vertical interface provided by the present preferred construction, the cells can only settle to the edge of the sample holding capillary tube. The diameter of the capillary is usually about 0.3 mm., which is too small for any significant bidirectional gravity induced exchange between plasma and potassium chloride.

Other important features of the new design include the type of resistance barrier utilized for achieving a high insulation between the pH and reference cells. In this aspect of the invention a body of trapped oil between fluid tight plugs is utilized which prevents water films from creeping between the walls of the electrode chamber and the insulators and eventually short-circuiting the electrode. The present oil barriers, as opposed to solid materials such as rubber and resins, effectively stop all unwanted migration of aqueous fluids in the cell.

Other improvements relate to the outlet of discharged electrolyte flush and sample so as to prevent any undesired back flow of the discharged fluids. Another feature of the invention is in the inlet tip that is connected to the sample holding tube. A plastic capillary tube in a rubber cone is utilized which is adapted for universal temporary sealing with syringes of various tip sizes, glass capillary tubes in which samples are often collected, and with other plastic and rubber tubing which may be directly connected to the capillary inlet tube.

With respect to the drawings, attention is directed to FIGS. 1 and 2 where the embodiment best adapted for placement in a water bath is illustrated. In this aspect of the invention, the cell includes an outer elongate tubular chamber 10 which houses both the pH electrode and the reference electrode. The walls of chamber 10 are suitably made from glass.

Internally and longitudinally within chamber 10 a sample holding capillary tube 11 of the glass membrane type is disposed. A suitable standard buffered solution 12 is disposed within chamber 10 around tube 11 between insulating assemblies 13 and 14. Insulating assemblies 13 and 14 are similar and are best seen in FIG. 2 with respect to assembly 14.

Assembly 14 comprises a body of oil 15 disposed between two oil tight plugs 16 and 17. Plugs 16 and 17 may be suitably formed from oil resistant rubber, for example. The plug-oil-plug type of insulation here utilized differs from most previously constructed electrodes which use solid barriers only. These solid barriers have tended to separate from the glass wall of the outer chamber due to thermal expansion coefficient differences. The body of oil is not subject to these disadvantages which ultimately result in a short circuit of the cell.

Insulating assembly 13 is similar to assembly 14 in the use of the body of oil between two oil tight plugs. However, instead of a simple plug on the front end of the unit, a closure member in the form of a cone 18, which may also be made from rubber, is utilized to contain oil 19. Cone 18 has an axial channel 20 therethrough and a central plastic capillary tube 21 is inserted through channel 20 to make an oil tight fit. Tube 21 is joined in fluid communication with capillary sample holding glass membrane 11 at one end and extends exteriorly of cone 18 at its other end. Tube 21 and cone 18 are adapted for forming a temporary tight seal with sample supplying syringes, capillaries, and tubing conduits. Tube 21 fits within the larger vessels and the seal is formed against cone 18. With smaller capillaries the seal is formed against the sloping tip of tube 21. The structure thus serves as a "universal" adaptor for filling the sample holding capillary from the various containers within which samples are often collected and supplied.

An electrode 22, which may be of the chlorided silver type for example, is inserted within chamber 10 to contact electrolyte 12. Electrode 22 is disposed rearwardly through insulating assembly 14 and within insulator 23 for making a conventional pH electrode circuit through wire 24. A reference electrode is shown generally at 25 and may be a calomel electrode, for example, comprising a platinum wire 26 dipped in mercury 27 which, in turn, is in contact with calomel paste 28. Platinum wire 26 is linked to electrical lead 24 in conventional fashion and is connected with pH electrode 22 through a suitable pH read-out unit (not shown).

The liquid junction provided by this invention includes a chamber J which is in fluid communication with reference cell 25 through conduit 29, and also in communication with liquid discharge conduit 30. Sample holding capillary tube 11 is inserted in loose fitting relationship internally of liquid discharge conduit 30 so that fluid can pass through conduit 30 around the exterior of capillary tube 11. Electrolytes such as potassium chloride are introduced into chamber J through inlet conduit 31 from a reservoir (not shown) which may suitably be a bottle disposed on a shelf above the unit to take advantage of gravity induced flow. Potassium chloride may then be flowed through inlet conduit 31 to fill chamber J and thence outwardly through discharge conduit 30 in sufficient volume to fill conduit 30 at least up to the open end 32 of sample tube 11. The liquid junction provided at end 32 can be flushed by flowing a fresh supply of electrolyte through conduit 31, through chamber J, around the outside of sample tube 11, and then discharging the old electrolyte out through conduit 30.

When the unit is in the horizontal position illustrated in FIGS. 1 and 2, it is to be noted that the interface between the sample in sample tube 11 and the fluid of the liquid junction is vertical, rather than horizontal and has the advantages hereinbefore mentioned.

In the embodiment of FIGS. 1 and 2, it is further to be noted that sample holding capillary tube 11 passes through reference electrode 25. The resulting structure is compact and has the advantage of thermal equilibrium between the pH and reference electrodes. With such a construction, the unit is conveniently adapted for placement in a water bath with the aid of mounting in walls 33 and 34, including O-rings 35 and 36 for creating desired seals.

At the rear end of the unit, a suitable plug 37 may be utilized through which the various conduits and wires protrude. It is convenient to utilize a bracket 38 about the end of chamber 10 through which the various conduits and tube pass from plug 37. Discharge conduit 30 passes axially outwardly therefrom and into a discharge receiving chamber 39 to which a source of negative pressure (not shown) is connected through tube 40. Discharge receiving chamber 39 includes an aperture 41 therein opening to the ambient atmosphere. By occluding aperture 41 and applying negative pressure through tube 40, sample can be drawn through sample holding capillary 11 for purposes of filling and emptying the capillary membrane. Flushings from the liquid junction chamber J also pass outwardly through discharge conduit 30 into chamber 39 and the waste fluids can be drawn off with suction through tube 40.

It should be noted that discharge conduit 30 extends into the central portion of discharge receiving chamber 39 and out of contact with the interior surfaces thereof. Discharge conduit 30 is suitably made of a non-wettable plastic such as Teflon. As a result, when liquid flows through conduit 30 and drops into chamber 39, electrical conductivity from the interior of the liquid junction chamber J through discharge conduit 30 to suction tube 40, which may electrically interfere, is avoided.

The embodiment illustrated in FIG. 3 shows how the unit can be adapted for inclusion within a water jacket 42, which may be filled and re-circulated with water at a preselected temperature through tube 43 and an outlet tube not shown. The pH electrode chamber 44 is elongate and formed centrally of jacket 42 and has generally the same configuration as its counter-part of the embodiment shown in FIGS. 1 and 2. In this case, since temperature uniformity is maintained by the water jacket 42, the pH electrode assembly 45 and the reference electrode assembly 46 may be formed transversely of the sample holding tube 47. Consequently, sample holding tube 47 does not pass through reference electrode 46.

Liquid junction chamber 48 is in all essential aspects the same as in the previously described embodiment. Thus, an inlet conduit 49 for potassium chloride, for example, provides electrolyte when valve 50 is opened by turning nob 51 so that the electrolyte flows through the remainder of conduit 49 at 52 into liquid junction chamber 48. Communication with the interior of reference electrode 46 and chamber 48 is accomplished around the exterior of conduit 52 at its point of entrance into chamber 48.

Sample holding capillary 47, as before, is inserted in loose fitting relationship with liquid discharge conduit 53, and a vertical interface is formed between the sample and potassium chloride at the terminous of sample holding tube 47 inside discharge conduit 53.

Discharged fluid leaves discharge conduit 53 and drops into discharge receiving chamber 54 and is removed by suction through tube 55. By occluding aperture 56 and placing negative pressure in chamber 54 sample can be drawn into and out from sample holding capillary 47.

Electrical leads from electrodes assemblies 45 and 46 pass through handle 57 and can be connected to a pH read-out as before. The inlet tip assembly 58 and technique of insulation with bodies of oil 59 and 60 are similar to that already described.

Although the foregoing invention has been described in some detail by way of illustration and example for purposes of clarity of understanding, it is understood that certain changes and modifications may be practiced within the spirit of the invention as limited only by the scope of the appended claims.

The present invention was developed with the aid of U.S. Public Health Service funds.

What is claimed is:

1. In a capillary pH electrode tube of the type having a section for holding buffered electrolyte solution and a sample holding capillary glass membrane in said tube disposed through said electrolyte solution, means for insulating said solution section and retaining the solution therein when said tube is horizontally oriented comprising a body of oil contained between a pair of substantially oil-tight plugs inserted interiorly of said electrode tube.

2. The capillary pH electrode tube and insulating means in accordance with claim 1 and further including a reference electrode interiorly of said pH electrode tube disposed on the opposite side of said insulating means relative to said buffered electrolyte solution, said sample holding capillary glass membrane passing through said insulating means and said reference electrode.

3. The capillary pH electrode tube and insulating means in accordance with claim 1 and further including a conical closure member for one end of said electrode tube, and a central plastic capillary tube inserted therethrough, said plastic capillary tube being joined at one end in fluid communication with said sample holding capillary glass membrane and extending exteriorly of said electrode tube at its other end, said exteriorly extending end in combination with the surface of the conical closure member being adapted for forming a temporary tight seal with means for supplying sample to said plastic capillary tube.

4. An improved cell for determining pH comprising: an enclosed liquid junction chamber for retention of fluid when oriented horizontally with the sample holding tube recited hereinafter to provide a vertical interface therebetween; a discharge conduit in permanently open and unrestricted fluid communication with said junction chamber; an inlet conduit for fresh electrolyte solution into said liquid junction chamber in permanently open and unrestricted fluid communication therewith; the open and unrestricted fluid communication between said inlet conduit, junction chamber, and discharge conduit permitting substantially complete flushing of the junction chamber by flowing fresh electrolyte solution therethrough; a pH electrode including a sample holding tube having one end in permanently open and unrestricted fluid communication with said junction chamber; a reference electrode; and an unrestricted conduit other than said discharge conduit establishing open and unrestricted fluid communication between said reference electrode and said junction chamber.

5. An improved cell for determining pH in accordance with claim 4 wherein said pH electrode comprises an elongate chamber for electrolyte having a sample holding ion sensitive capillary tube internally longitudinally thereof.

6. An improved cell for determining pH in accordance with claim 5 wherein said reference electrode is positioned internally of the elongate chamber of said pH electrode and said sample holding capillary tube passes through said reference electrode.

7. An improved cell for determining pH in accordance with claim 6 and including means for controlling the temperature of said electrodes positioned exteriorly of the elongate chamber of said pH electrode.

8. An improved cell for determining pH in accordance with claim 5 wherein said sample holding capillary tube is inserted interiorly of said discharge conduit in a loose fitting relationship to permit fluid passage around the exterior of said sample holding tube.

9. An improved cell for determining pH in accordance with claim 8 and including a discharge receiving chamber connected in fluid communication with said discharge conduit, and a source of negative pressure connected to said discharge receiving chamber.

10. An improved cell for determining pH in accordance with claim 9 wherein said discharge conduit extends into the central portion of said discharge receiving chamber and out of contact with the interior surfaces thereof to avoid electrical interference.

11. An improved cell for determining pH comprising: an enclosed liquid junction chamber for retention of fluid in selected orientations including a generally horizontal orientation with the sample holding tube recited hereinafter to provide a vertical interface therebetween; a discharge conduit in permanently open and unrestricted fluid communication with said junction chamber; an inlet conduit for fresh electrolyte solution into said liquid junction chamber in permanently open and unrestricted fluid communication therewith; the open and unrestricted fluid communication between said inlet conduit, junction chamber, and discharge conduit permitting substantially complete flushing of the junction chamber by flowing fresh electrolyte solution therethrough; a pH electrode including a sample holding tube having one end in permanently open and unrestricted fluid communication with said junction chamber; a reference electrode; and an unrestricted conduit other than said discharge conduit establishing open and unrestricted fluid communication between said reference electrode and said junction chamber.

References Cited

UNITED STATES PATENTS

| 1,990,768 | 9/1933 | Youden | 204—195.1 |
| 2,913,386 | 11/1959 | Clark | 204—195 |
| 3,140,247 | 7/1964 | Fournie | 204—195.1 |
| 3,216,915 | 11/1965 | Arthur et al. | 204—195.1 |
| 3,250,688 | 5/1966 | Arthur | 204—195.1 |

OTHER REFERENCES

Lin: "Jour. of Scientific Instruments," vol. 21, No. 2, February 1944, p. 32.

Johnson: "Chemistry & Industry," June 17, 1939, pp. 573 and 574.

Dole: "The Glass of Electrode," 1941, pp. 170–172.

Reilley: "Advances in Analytical Chemistry and Instrumentation," vol. 2, 1963, pp. 100–102.

JOHN H. MACK, *Primary Examiner.*

T. TUNG, *Assistant Examiner.*

U.S. Cl. X.R.

128—2.1; 204—286